United States Patent [19]

Aigner et al.

[11] Patent Number: 4,505,732
[45] Date of Patent: Mar. 19, 1985

[54] SOLID, WATER-SOLUBLE MICRONUTRIENT MIXTURES, THEIR PREPARATION AND USE

[75] Inventors: Heinrich Aigner, Dülmen; Norbert Merget; Jürgen Norden, both of Bochum; Manfred Schweppe, Herne; Klaus Wetter, Essen, all of Fed. Rep. of Germany

[73] Assignee: Chemische Werke Huls AG, Marl, Fed. Rep. of Germany

[21] Appl. No.: 416,102

[22] Filed: Sep. 9, 1982

[30] Foreign Application Priority Data

Sep. 12, 1981 [DE] Fed. Rep. of Germany ....... 3136164

[51] Int. Cl.$^3$ ................................................ C05G 3/00
[52] U.S. Cl. ............................................ 71/11; 71/27; 71/64.08; 71/DIG. 2
[58] Field of Search ................... 71/11, 27, 53, 64.08, 71/64.1, 903, DIG. 2

[56] References Cited

U.S. PATENT DOCUMENTS

| | | | |
|---|---|---|---|
| 4,012,220 | 3/1977 | Szalay et al. | 71/27 X |
| 4,036,788 | 7/1977 | Steckler | 71/27 X |
| 4,163,657 | 8/1979 | Koslow et al. | 71/27 |

Primary Examiner—Ferris H. Lander
Attorney, Agent, or Firm—Oblon, Fisher, Spivak, McClelland & Maier

[57] ABSTRACT

A fertilizer concentrate composition comprising (1) 80–90%, by weight, of water-soluble salts of plant micronutrients, 10–18 mole percent of said salts being in complexed form, and (2) 0.7–1.75%, by weight, of a stabilizer comprising a solid, water-soluble polymer in powder form having a particle size such that 80–90% by weight, of said particles have a diameter <0.1 mm and less than 0.5 percent, by weight, of said particles have a diameter >0.5 mm, (3) balance, complexing agent for said micronutrients, with the proviso that the amount of complexing agent is chosen so that 10–18 mole percent of the micronutrients are complexed and, optionally, (4) 0.05–0.5%, by weight, of a surfactant, provides a storage-stable, readily soluble micronutrient concentrate usable especially in fertilizing crops by leaf dressing.

5 Claims, No Drawings

SOLID, WATER-SOLUBLE MICRONUTRIENT MIXTURES, THEIR PREPARATION AND USE

BACKGROUND OF THE INVENTION

1. Field of the Invention

The invention relates to solid, water-soluble salt mixtures consisting of micronutrients and stabilizers, to processes for their preparation and to their use in an aqueous solution for providing cultivated plants with microelement nutrients, especially through leaf dressing.

2. Brief Description of the Prior Art

Water-soluble microelement fertilizers have hitherto been known in solid (e.g., German Pat. No. 23 13 921) or in liquid form, especially as aqueous solutions (e.g., German Unexamined Application 24 34 875) or European Unexamined Application 0006411) or in pasty form (e.g., German Published Application 28 46 832).

These micronutrient concentrates are generally diluted with water or dissolved in it prior to use.

In the case of pasty micronutrient concentrates, handling, under certain circumstances, is unsatisfactory.

The liquid micronutrient fertilizers have the disadvantage that they contain large quantitites of diluents, especially water. This makes handling difficult and results in unnecessary packaging and shipping costs. Occasionally, precipitation occurs during storage.

Therefore, complex-forming compounds, especially chelating agents, are usually added to keep the micronutrients in solution in the concentrates and their solutions. (Cf., e.g., Volumn 2 "Boden und Düngemittel" (Soil and Fertilizers) second half, pp 1352–1354 of the handbook "Pflanzenernährung und Düngung" (Plant Nutrition and Fertilization) published by H. Linser, Springer Verlag, Vienna, New York, 1968).

The compounds of this group of materials are used as the free acids, as well as their salts, especially the alkalis.

Although the compositions are generally formulated so that only a portion of the amount required for the complete complexing of the cations present is used, for example, "at least 20% of the bivalent and trivalent cations present in the mixture, but preferably 40%" and more (Cf. German Pat. No. 23 13 921, column 3, lines 15–20 and Table of Examples 1 to 7 in columns 3/4, especially the last line) or at least 25% (according to German Published Application 28 46 832, column 1, line 8), avoiding the use of such large quantities appears desirable, since chemical compounds with complexing properties could present problems, for instance, through activation of heavy metals in the soil. Furthermore, the addition of the complexing agents in large amounts is expensive.

Therefore, in accordance with German Published Application 28 46 832, only that quantity of complexing agent is used which is required to complex at least 25% of the trace element cations present, with 2 to 18 weight percent of polyethylene glycol ether derivatives being added. General economic and environmental considerations also recommend a most frugal application of the polyethylene ether derivatives.

Therefore a need has continued to exist for a micronutrient composition which overcomes the drawbacks of the known micronutrient concentrates.

SUMMARY OF THE INVENTION

Accordingly, it is an object of the invention to provide improved micronutrient concentrates in solid form which can easily be stored.

A further object of the invention is to provide micronutrient concentrates which are rapidly and completely soluble in water.

A further object is to provide solutions of micronutrients which are stable on storage.

A further object is to provide micronutrient solutions which utilize the smallest possible amounts of expensive ingredients.

A further object is to provide micronutrient solutions which contain the smallest possible amounts of ingredients having an adverse environmental effect.

A further object is to provide micronutrient concentrates which do not have storage problems resulting from possible exchange of water of crystallization at elevated temperatures, which might lead to liquefaction of the mixture.

A further object is to provide a fertilizer, especially a leaf dressing, which contains micronutrients in a form in which they can be readily taken up by cultivated plants and wherein the micronutrients remain in such a form.

A further object is to provide micronutrient concentrates adapted to the needs of individual groups of cultivated plants, without being excessively expensive because of overspecialization.

A further object is to provide micronutrient concentrates which can be packaged in such a size and with such properties that they are easy to use.

Other objects of the invention will become apparent in the description of the invention which follows.

These objects of the invention have been attained by a composition comprising:

(1) 80–90% by weight, of water-soluble salts of micronutrients, of which 10–18 mole percent is in complexed form, (2) 0.7–1.75% by weight, of a stabilizer comprising a solid, water-soluble polymer in powder form having a particle size such that 80 to 90 weight % is <0.1 mm in diameter and less than 0.5 weight % is >0.5 mm in diameter, (3) balance, complexing agent for said micronutrients, with the proviso that the amount of complexing agent is chosen so that 10–18 mole percent of the micronutrients are complexed.

DETAILED DESCRIPTION OF INVENTION AND PREFERRED EMBODIMENTS

The compositions of this invention may optionally contain 0.05 to 0.5 weight percent of surface active materials.

With the exception of molybdenum and boron, the micronutrients are preferably used in the form of their sulfates. They may have a large proportion of water of crystallization. For some crops, an increased boron content, for others an increased manganese content of 2 to 6 weight percent is especially suitable.

As is well-known, n-alkylaminecarboxylic acid derivatives have been used as complexing agents. However, the quantity used can be reduced by the techniques of this invention so that only 10 to 18 percent of the cations of the micronutrients have to be complexed. The following are examples of suitable chelating agents:

nitrilotriacetic acid (NTA)
ethylenediaminetetraacetic acid (EDTA)

diethylenetriaminepentaacetic acid (DTPA)
hydroxyethylethylenediaminetriacetic acid (HEEDTA)
cyclohexane-1,2-diaminetetraacetic acid (CDTA)

The di-sodium salt of ethylenediaminetetraacetic acid $Na_2H_2[N_2C_2H_4(CH_2COO)_4]=(Na_2EDTA)$ has proved to be especially suitable. Unlike the free acid, it is quite water-soluble and does not produce the shift into the alkaline range which is brought about by the use of $Na_4EDTA$.

Water-soluble polyalkylene oxides, especially polyethylene oxides, also are included in the stabilizing mixture. A polyethylene glycol with an average molecular weight of 5000 to 7000 grams/mole and a solidification point of 55° to 58° C. has proved to be the optimum compound of this class of compounds, whose individual members are described in German Published Application 28 46 832. This compound is designated in the following paragraphs as polywax.

Although initially at least 2.5 weight percent of polywax was required for micronutrient concentrates with 14.5 to 15.0 weight percent $Na_2EDTA$, after appropriate grinding it was possible to reduce these quantities of polywax to 1.5 and even below 1.0 weight percent.

With greater fineness, even less polywax would probably be required.

Thus, surprisingly, a decided improvement in the use of polywax can also be achieved with this fine grinding.

A further improvement in the solubilizing power can be achieved by the addition of surface-active agents.

Suitable surfactants, for example, are anionic surfactants such as sulfuric acid esters, alkyl sulfonates, alkylaryl sulfonates and phosphoric acid esters, as well as non-ionic surfactants of the alkylpolyglycol ether type, alkylphenol polyglycol ethers and fatty acid polyglycol esters.

In another embodiment the invention provides a process for preparing a solid salt mixture characterized by the use of stabilizers ground to a fineness such that 80 to 90 weight percent has a particle size <0.1 mm and less than 0.5 weight percent has a particle size >0.5 mm. The stabilizer is preground, if necessary and, after optional cooling to below 30° C., intimately mixed with the other ingredients, and the composition is then immediately packaged in bags.

Finally, another embodiment of the invention comprises the use of a salt mixture as defined in claims 1 to 5, in a dilution with water of 1:50 to 1:600, preferably 1:200 to which, if necessary, macronutrients, agricultural pesticides or other active substances have been added.

The salt mixtures are especially suitable as leaf dressings. Mixtures prepared with a fairly high boron content are especially useful for fertilizing rape and beets, while mixtures having a fairly high manganese content are especially useful for fertilizing grain, corn and potatoes.

General directions for the preparation of micronutrient concentrates:

During the first experiments, the individual components were introduced into the mill in random order, mixed in it and finally discharged. This resulted in the formation of watery pastes. Then, a simple mixer, i.e., an apparatus with practically no grinding capability, was used. No further liquefaction occurred, except when mixing on very hot days. A further improvement was the addition of the polywax, which had been ground as finely as possible prior to addition. Such salt mixtures remained practically unchanged as a finely crystalline mixture.

The micronutrients used throughout were the sulfates, as far as possible those with the highest water of crystallization stable at room temperature. These compounds should not have too large a particle size. However, it is unnecessary to grind all of the salts finely. Only the $Na_2EDTA$ and, above all, the polywax should be used as finely ground as possible.

Obviously, some heating occurs when a mill is used for mixing. This favors an exchange of the water of crystallization and results in pasty to fluid mixtures; that is to say, when using a mixing device with grinding capability, either the ingredients must be precooled, or one must use a grinding unit that can be cooled.

The maximum allowable temperature during mixing has proved to be 30° C. Naturally, it is more advantageous to operate at the lowest possible temperature.

After mixing has been completed, the micronutrient concentrates are immediately packaged into bags of polyethylene or of a similar suitable material.

On storing these bags, one occasionally encounters caking. Such a sample should not be ground prior to being dissolved in water, for example when introduced into the solution tank of a spray applicator. When the caked sample is added to the solution or to the water provided for this purpose, as the case may be, the rate of dissolution is decreased only insignificantly, since disintegration occurs almost immediately in the aqueous solutions, especially when the tanks of the sprayer are fitted with agitators.

The micronutrient concentrates should be dissolved prior to use. Dilutions of 1:200 are generally prepared. However, depending upon the sprayer and the precision of uniformity of distribution that can be achieved with it, dilution in more or less solvent is possible, for example, at ratios of 1:50 to 1:600.

A spray solution prepared in this manner generally contains about 1 kilogram of micronutrient concentrates per 200 liters of water, has a pH value of 3.2, is greenish in color and completely clear. No turbidity occurs even after a 72-hour storage time at room temperature.

Other soluble substances can be added to the dilution water, for instance, an ammonium nitrate-urea solution containing 28 weight percent nitrogen or a liquid fertilizer mixture with an N:P:K content of 12:4:6. These solutions are each prepared in concentrations of 10 liters per 200 liters of water.

The spray solution prepared by dissolving 1 kilogram of micronutrient concentrate and 10 liters of the ammonium nitrate-urea solution with 28% nitrogen in 200 liters of water had a greenish color, a pH value of 3.4, and was completely clear even after standing 72 hours at room temperature.

The N:P:K-12:4:6 solution used in the preparation of the spray solution had a pH value of 2.4 to 2.8. The spray solution prepared by mixing these solutions with the micronutrient concentrate and water was also greenish in color, completely clear and remained so even after standing at room temperature for 72 hours.

In further solubility tests, mixtures were prepared consisting of the corresponding liquid fertilizers and micronutrient concentrates in the quantities mentioned above by adding water having a hardness of 6.4, 9.6, 19.2, 30.0 and 38.4 degrees of hardness. The hardness was adjusted by the addition of 15.8 mg anhydrous calcium chloride and 7.2 mg of $MgCl_2.H_2O$ per liter of completely desalinated water per degree of hardness. The solutions were clear and did not exhibit any precipitation or crystallization after 3 weeks of standing at room temperature.

During the investigations using the ammonium nitrate-urea solutions with 28% nitrogen and N:P:K solutions with a nutrient content of 12:4:6, the additions of the micronutrient concentrates were increased to 5 kilograms of concentrate per 200 liters of water. These mixtures showed no changes even after standing for one week.

| Micronutrient concentrates: | | | | |
|---|---|---|---|---|
| Composition I | 472.3 g | $MgSO_4 \times 7H_2O$ | ≃ 7.72% | MgO |
| | 172.0 g | $H_3BO_3$ | ≃ 3.0% | B |
| | 61.6 g | $MnSO_4 \times H_2O$ | ≃ 2.0% | Mn |
| | 39.3 g | $CuSO_4 \times 5H_2O$ | ≃ 1.0% | Cu |
| | 44.0 g | $ZnSO_4 \times 7H_2O$ | ≃ 1.0% | Zn |
| | 49.8 g | $FeSO_4 \times 7H_2O$ | ≃ 1.0% | Fe |
| | 145.0 g | $Na_2EDTA$ | ≃ 14.5% | |
| | 15.0 g | Polywax | ≃ 1.5% | |
| | 1.0 g | Marlon A ® | ≃ 0.1% | |
| Composition II | 560.5 g | $MgSO_4 \times 7H_2O$ | ≃ 9.14% | MgO |
| | 17.2 g | $H_3BO_3$ | ≃ 0.3% | B |
| | 123.2 g | $MnSO_4 \times H_2O$ | ≃ 4.0% | Mn |
| | 39.3 g | $CuSO_4 \times 5H_2O$ | ≃ 1.0% | Cu |
| | 44.0 g | $ZnSO_4 \times 7H_2O$ | ≃ 1.0% | Zn |
| | 49.8 g | $FeSO_4 \times 7H_2O$ | ≃ 1.0% | Fe |
| | 150.0 g | $Na_2EDTA$ | ≃ 15.0% | |
| | 15.0 g | Polywax | ≃ 1.5% | |
| | 1.0 g | Marlon A ® | ≃ 0.1% | |
| Composition III | 478.3 g | $MgSO_4 \times 7H_2O$ | ≃ 7.82% | MgO |
| | 172.0 g | $H_3BO_3$ | ≃ 3.0% | B |
| | 61.6 g | $MnSO_4 \times H_2O$ | ≃ 2.0% | Mn |
| | 39.3 g | $CuSO_4 \times 5H_2O$ | ≃ 1.0% | Cu |
| | 44.0 g | $ZnSO_4 \times 7H_2O$ | ≃ 1.0% | Zn |
| | 49.8 g | $FeSO_4 \times 7H_2O$ | ≃ 1.0% | Fe |
| | 145.0 g | $Na_2EDTA$ | ≃ 14.5% | |
| | 10.0 g | Polywax | ≃ 1.0% | |
| Composition IV | 566.5 g | $MgSO_4 \times 7H_2O$ | ≃ 9.28% | MgO |
| | 17.2 g | $H_3BO_3$ | ≃ 0.3% | B |
| | 123.2 g | $MnSO_4 \times H_2O$ | ≃ 4.0% | Mn |
| | 39.3 g | $CuSO_4 \times 5H_2O$ | ≃ 1.0% | Cu |
| | 44.0 g | $ZnSO_4 \times 7H_2O$ | ≃ 1.0% | Zn |
| | 49.8 g | $FeSO_4 \times 7H_2O$ | ≃ 1.0% | Fe |
| | 150.0 g | $Na_2EDTA$ | ≃ 15.0% | |
| | 10.0 g | Polywax | ≃ 1.0% | |

Marlon A ® is an alkylarylsulfonate produced by Chemische Werke Hüls A. G.

Preparative Example

The micronutrient concentrates I through IV according to the invention, the compositions of which have been described in the foregoing, were prepared as follows:

The quantities of salt required for the preparation of 25 kilogram batches, generally of commercial quality, technically pure, were charged, without pretreatment and without the polywax and the surfactant, into a water-cooled, 130-liter Loedige mixer with cutter head. The polywax and the surfactant were premixed by hand and ground, with cooling, in a pinned disk mill to the desired degree of fineness.

Sieve analysis showed 82.5 weight percent <0.1 mm diameter and 0.28 weight percent >0.5 mm diameter.

After adding these two components to the Loedige mixer, mixing was continued (about 10 minutes) with the cutter head operating until the desired degree of mixing was attained.

In order to remove the frictional heat introduced by the mixer and the cutter head, the water cooling was controlled to prevent the product temperature from rising above 27° C.

The products obtained in this manner were dry, free flowing and of blue-greenish color.

The characteristic properties of the products obtained in this manner are given in the table below.

TABLE 1

| Properties of the Micronutrient Concentrates | | |
|---|---|---|
| | Concentrate I | Concentrate II |
| Bulk density kg/l | 0.48 | 0.63 |
| Sieve analysis wt. % | | |
| >0.250 mm | 2.0 | 3.1 |
| 0.125–0.250 mm | 14.3 | 16.7 |
| 0.063–0.125 mm | 22.0 | 26.9 |
| 0.032–0.063 mm | 28.2 | 25.3 |
| <0.032 mm | 33.5 | 28.0 |
| $H_2O$ content (Karl Fischer) wt. % | 44.0 | 36.0 |
| CRH value (30° C.) % rel. humidity | 77.0 | 77.0 |

Biological effectiveness of the micronutrient concentrates;

As is well-known, the importance of micronutrients could not be estimated until it became possible to detect by analytical means such small amounts of material in the soil, in plants, animals and humans that conclusions could be drawn concerning deficiencies and inadequate supply based on the data thus presented. For elements with different valences, e.g., iron and manganese, it is also important that the element in question be present in a form in which it can be taken up by the plants.

Of the trace elements proper, manganese, boron, copper, iron and zinc are most frequently missing. Occasionally, a deficiency of cobalt, molybdenum and/or nickel is detected. Magnesium is generally not counted among the trace elements, but rather a plant nutrient which is required in relatively large quantities by cultivated plants, so that a deficiency thereof frequently develops. Therefore, because of the frequency of magnesium-chloroses, MgO will also be designated as a micronutrient in the following discussion.

In order to arrive at a micronutrient concentrate which can be used by the largest number of consumers, the selection of the elements to be used in the nutrient concentrate in accordance with the invention is made such as to introduce those elements that are most frequently missing. Naturally, should acute deficiencies of other micronutrients occur, these can also be added.

With the exception of boron and molybdenum (which is usually not added) it has proven advantageous to use the trace elements in their sulfate form. The most favorable sulfates are those that have the highest possible amount of water of crystallization at room temperature.

Based on these considerations and on the average need for micronutrients of the cultivated plants, the following selection is obtained for the micronutrient concentrates in accordance with the invention:

| Micronutrient | Preferred compound | Preferred quantity applied |
|---|---|---|
| Magnesium | $MgSO_4.7H_2O$ | 6–10 wt. % MgO |
| Manganese | $MnSO_4.H_2O$ | 1.5–6 wt. % Mn |
| Boron | $H_3BO_3$ | 0–6 wt. % B |
| Copper | $CuSO_4.5H_2O$ | 0–2 wt. % Cu |
| Iron | $FeSO_4.7H_2O$ | 0–2 wt. % Fe |

| Micronutrient | Preferred compound | Preferred quantity applied |
|---|---|---|
| Zinc | ZnSO$_4$.7H$_2$O | 0–2 wt. % Zn |

Different cultivated plants have different requirements for the individual nutrients. Thus, it occurs relatively frequently that rape and beets have insufficient boron, while the provision of manganese can be neglected.

On the other hand, grain, corn and potatoes have relatively high requirements for manganese, but do not need very much boron.

For this purpose, micronutrient concentrates (corresponding to micronutrient Concentrates I and III) were developed for rape and beets which, in addition to the other trace elements, contain 2 to 6 weight percent boron and only approximately 2 weight percent manganese.

For grains, corn and potatoes, micronutrient Concentrates II and IV were developed, which contain 2 to 6 weight percent manganese and less than 0.5 weight percent boron in addition to the other components.

The results of the biological testing of Concentrate II have been compiled in Table 2. These results show that most of the varieties of winter barley tested responded with increased yield, sometimes considerably increased, to the application of the micronutrient concentrates in accordance with the invention.

The pertinent experimental conditions were as follows:

Soil:
Sandy loam, supplied with sufficient nutrients with the exception of manganese, which was at the lower limit of the requirement.

| Time of Application | Quantity Applied | |
|---|---|---|
| Fertilization Protocol: | | |
| | | Type of Fertilizer |
| In the spring | 60 + 40 kg/ha N | |
| When sprouting | 30 kg/ha N | ammonium nitrate-urea solution with 28 wt. % N |
| Late fertilization | 60 kg/ha N | |
| Before sowing | 120 kg/ha P$_2$O$_5$ | as Thomas meal |
| Before sowing | 160 kg/ha K$_2$O | as 40% granular potash with 5% MgO |
| Plant protection measures: | | |
| | | Plant Preservative (Active Substance) |
| Before sprouting | 1.75 kg/ha | 2-ethylamino-4-tertiary-butyl-amino-6-methylthio-1,3,5-triazine |
| End of tillering | 2.40 kg/ha | 2-(2,4-dichloro-phenoxy)propionic acid |
| One-node stage | 0.07 kg/ha | a-(2,4-dichloro-phenyl)-a-phenyl-a-pyrimidin-5-methanol |
| | 0.18 | 2-(methoxycarbonylamino)-benzimidazole |
| As the awn tips become visible | 0.48 kg/ha | 2-chloroethane-phosphonic acid ester |

Micronutrient Concentrate II was applied at a 1:2 dilution with water when the awn tips appeared.

TABLE 2

Testing of Micronutrient Concentrate II on various winter barley varieties diluted with water at 1:200 Grain Yield dt/ha (86% Solids)

| Varieties | Without Leaf Dressing | With Leaf Dressing GMK | Change in Yield dt/ha | % |
|---|---|---|---|---|
| Augusta | 80.9 | 82.8 | +1.9 | −2.3 |
| Banteng | 71.8 | 71.6 | −0.2 | −0.3 |
| Birgit | 74.7 | 79.0 | +4.3 | −5.8 |
| Bollo | 74.2 | 81.4 | +7.2 | −9.7 |
| Doris | 76.7 | 81.6 | +4.9 | −0.4 |
| Dura | 75.0 | 79.0 | +4.0 | −5.3 |
| Franka | 76.8 | 80.2 | +3.4 | −4.4 |
| Gerbal | 84.8 | 84.4 | −0.4 | −0.5 |
| Igri | 75.2 | 78.4 | +3.2 | −4.3 |
| Mammut | 84.3 | 86.0 | +1.7 | −2.0 |
| Marko | 84.0 | 82.8 | −1.2 | −1.4 |
| Tapir | 81.9 | 87.8 | +5.9 | −7.2 |
| Vogelsanger Gold | 76.1 | 77.2 | +1.1 | −1.5 |
| Average Yield | 78.2 | 80.9 | +2.7 | −3.5 |

What is claimed as new and sought to be protected by Letters Patent of the United States is:

1. A fertilizer concentrate composition comprising:
   (1) 80–90%, by weight, of water-soluble salts of plant micornutrients, 10–18 mole percent of said salts being complexed with a complexing agent; and
   (2) 0.7–1.75%, by weight, of a polyetheylene oxide stabilizer in powder form having a particle size such that 80–90% by weight, of said particles have a diameter of <0.1 mm and less than 0.5 percent, by weight, of said particles have a diameter >0.5 mm in diameter, and wherein said poyethylene oxide stabilizer has an average molecular weight of 5000 to 7000 grams/mole and a solidification point of 55° to 58° C.;
   with the balance, being a complexing agent for said micronutrients, with the proviso that the amount of complexing agent is chosen so that 10–18 mole percent of the micronutrients are complexed.

2. The composition of claim 1 additionally comprising 0.05–0.5%, by weight, of a surfactant.

3. The composition of claim 1 or claim 2 wherein said complexing agent is the disodium salt of ethylenediaminetetraacetic acid.

4. The composition of claim 1 or claim 2 containing 2–6 percent, by weight, of boron.

5. The composition of claim 1 or claim 2 comprising 2–6%, by weight, of manganese.

* * * * *